Patented Oct. 8, 1940

2,216,978

UNITED STATES PATENT OFFICE 2,216,978

PROCESS FOR PRODUCING PREGNANONE COMPOUNDS

Russell Earl Marker, State College, Pa., assignor to Parke, Davis & Company, Detroit, Mich., a corporation of Michigan No Drawing. Application August 6, 1937,
Serial No. 157,775

4 Claims. (Cl. 260—397)

The invention relates to the preparation of hydroxy ketone derivatives of sterols and more particularly to ring-saturated compounds of this type belonging to the pregnane series containing twenty-one carbon atoms and having a dimethyl-cyclo-pentano-perhydrophenanthrene structure.

It is known that the urine of pregnant women contains the compound, epi-allo-pregnanolone, which may also be designated as 3-epi-hydroxy-allo-pregnanone-20 and is a hydroxy ketone derivative of pregnane. The formulas for epi-allo-pregnanolone and its parent hydrocarbon, pregnane, are as follows:

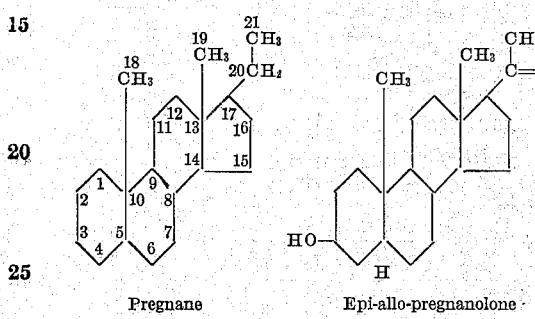

Pregnane     Epi-allo-pregnanolone

Epi-allo-pregnanolone is a remarkable compound in that it possesses male hormone activity, although produced and eliminated by the pregnant female. It is also important because it can serve as a starting material for preparation of other compounds having sex hormone properties.

It is an object of the present invention to provide a method whereby compounds of the type of epi-allo-pregnanolone may be obtained by chemical methods from readily available sterol compounds. It is a further object to provide a method which will yield a product of high purity. Other objects of the invention will appear from the following description.

It has now been found that the halogen derivative of a ring-saturated sterol compound, wherein the hydroxyl group of the latter has been replaced by a halogen atom, can be oxidized by controlled step-wise oxidation to degrade the hydrocarbon side-chain of the sterol, usually attached to carbon atom No. 17 of the sterol nucleus, and to convert it into an acetyl group. The resulting compound is a halogen derivative of pregnanone-20, and it has now also been found that the halogen derivative may be converted to its corresponding pregnanolone compound by hydrolyzing off the halogen and replacing it by the hydroxyl radical. The chemical transformations involved are of a type which may be illustrated briefly by the following scheme.

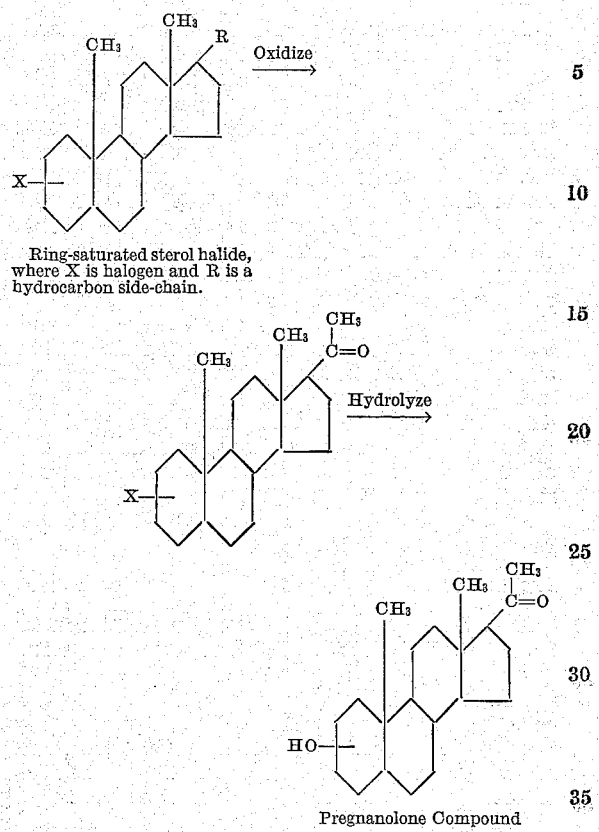

Ring-saturated sterol halide, where X is halogen and R is a hydrocarbon side-chain.

Pregnanolone Compound

The invention can be illustrated by the following examples relating to preparation of the specific pregnanolone, 3-epi-allo-pregnanol-one-20, from the ring-saturated sterol halide compound, alpha-cholestyl chloride.

*Preparation of 3-chloro-allo-cholanic acid*

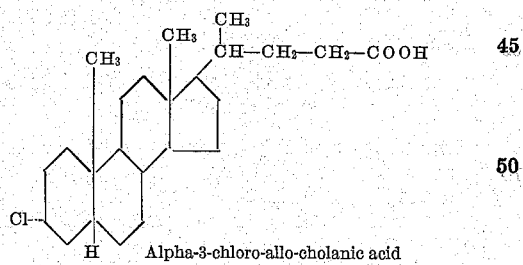

Alpha-3-chloro-allo-cholanic acid

This compound is prepared from the ring-saturated sterol halide, alpha-cholestyl chloride, by chromic oxide oxidation as described by Marker, Whitmor and Kamm, J. A. C. S. volume 57, pages 2358–60, December, 1935. It crystallizes from acetone and has a melting point of 180° C.

*Preparation of the methyl ester of 3-chloro-allo-cholanic acid*

15 cc. of concentrated sulfuric acid is added to a solution of 100 grams of 3-chloro-allo-cholanic acid, m. pt. 180° C., in 3 liters of methyl alcohol. The solution is refluxed for 2 hours with distillation of the alcohol in the meantime to a volume of about 500 cc. The solution is cooled to obtain a crystalline product which is then recrystallized from methyl alcohol and shows a melting point of 133° C.

Anal. Calcd. for $C_{25}H_{41}O_2Cl$: C, 73.2; H, 10.1. Found: C, 72.8; H, 10.3.

*Preparation of 3-chloro-allo-nor-cholanyl-diphenylcarbinol*

A solution of 27 grams of methyl-3-chloro-allo-cholanate in 800 cc. of ether is added over a period of one hour to a stirred and gently refluxing solution of 0.27 mole of phenyl magnesium bromide in 600 cc. of ether. The solution is stirred and refluxed for 4 hours, after which the ether is distilled off until the temperature of the remaining solution reaches 40° C. Most of the solids dissolve at this point to form a clear solution. The solution is maintained at 40° for one hour, decomposed with 1 liter of dilute sulfuric acid and extracted with ether. The ether solution is washed with water and concentrated to 200 cc. 200 cc. of methyl alcohol is added to the concentrated ether solution and the resulting solution is further concentrated to 250 cc. When this solution is cooled and shaken, the carbinol crystallizes out as a white solid. This is recrystallized from methyl alcohol and then has a melting point of 171° C.

Anal. Calcd. for $C_{36}H_{49}OCl$: C, 81.1; H, 9.2. Found: C, 81.1; H, 9.3.

*Preparation of 3-chloro-nor-allo-cholanic acid*

A solution of 14.3 grams of chromic oxide in 140 cc. of 90% acetic acid is added over a period of 25 minutes to a solution of 19 grams of 3-chloro-nor-allo-cholanyl diphenylcarbinol in 375 cc. of glacial acetic acid at 90°. The solution is stirred an additional 3 hours at 90°, cooled to room temperature and 1800 cc. of 10% hydrochloric acid is added slowly with shaking. The mixture is allowed to stand overnight and filtered. The solid which is filtered off is stirred with 100 cc. of boiling methanol, cooled and filtered. The solid is then washed with cold methanol, leaving a crystalline product free of benzophenone. This is recrystallized from methanol and shows a melting point of 248° C. The yield is 10.5 grams of crystals.

Analysis. Calculated for $C_{23}H_{37}O_2Cl$: C, 72.5; H, 9.8. Found: C, 72.8; H, 9.6.

*Preparation of the methyl ester of 3-chloro-nor-allo-cholanic acid*

The compound is prepared by a method analogous to that used in making the methyl ester of 3-chloro-allo-cholanic acid described above. The melting point for the product is found to be 178° C.

Anal. Calcd. for $C_{24}H_{39}O_2Cl$: C, 73.0; H, 10.0. Found: C, 73.3; H, 10.2.

*Preparation of 3-chloro-allo-bis-nor-cholanyl diphenylcarbinol*

This compound is made in a manner analogous to the above described preparation of its lower homolog, 3-chloro-allo-nor-cholanyl-diphenylcarbinol. It has a melting point of 183°.

Anal. Calcd. for $C_{35}H_{47}OCl$: C, 80.9; H, 9.1. Found: C, 80.8; H, 9.3.

*Preparation of 3-chloro-bis-nor-allo-cholanic acid*

The diphenylcarbinol compound described in the last example above is oxidized by chromic acid to 3-chloro-bis-nor-allo-cholanic acid in the same manner as described above for preparation of 3-chloro-nor-allo-cholanic acid. The compound of this example has a melting point of 231° C.

Anal. Calcd. for $C_{22}H_{35}O_2Cl$: C, 71.9; H, 9.6. Found: C, 71.8; H, 9.3.

*Preparation of the methyl ester of 3-chloro-bis-nor-allo-cholanic acid*

This is made from the acid of the last example given above by the same general method as described above for preparation of the methyl ester of 3-chloro-allo-cholanic acid. The methyl ester of this example has a melting point of 151°.

Analysis calculated for $C_{23}H_{37}O_2Cl$: C, 72.5; H, 9.8. Found: C, 72.5; H, 9.8.

*Preparation of 3-chloro-allo-ter-nor-cholanyl diphenylcarbinol*

This is prepared from its corresponding methyl ester by a method analogous to that described above for preparation of 3-chloro-allo-nor-cholanyl-diphenylcarbinol. It melts at 146° C.

Anal. Calcd. for $C_{34}H_{45}OCl$: C, 80.0; H, 9.0. Found: C, 80.9; H, 9.2.

*Preparation of epi-allo-pregnanol-3-one-20*

A solution of 11 grams of 3-chloro-allo-ter-nor-cholanyl diphenylcarbinol is boiled for 6 hours with a mixture of 100 cc. of acetic acid and 100 cc. of acetic anhydride. The solvent is evaporated and the residue dissolved in 400 cc. of chloroform and then ozonized at 0° C. The chloroform is evaporated in vacuo and 225 cc. of acetic acid added and the solvent distilled from the solution until the latter has a volume of 50 cc. 400 cc. of acetic acid is added and the resulting solution heated with 15 grams of granulated zinc until a sample no longer gives a color with starch iodide paper. The solution is then filtered and evaporated to dryness in vacuo. The residue is boiled for 10 hours with a solution of 30 grams of potassium acetate in 60 cc. of valeric acid. A large excess of alcoholic potassium hydroxide is added and the mixture boiled for an hour, diluted with water and then shaken with ether. The ethereal solution is separated, washed, dried, and exaporated to give a residue containing epi-allo-pregnanolone. If desired, this epi-allo-pregnanolone product can be purified by converting it to its acid succinate which forms water-soluble alkali metal salts capable of separation from water-insoluble impurities. The alkali metal salt thus purified is converted back into the acid succinate which is then hydrolyzed to replace the succinic acid radical by a hydroxyl group with production of purified epi-allo-pregnanolone. The latter may be even further purified by converting it to its crystalline semicarbazone and separating it from impurities and finally hydrolyzing the purified semicarbazone with the production of very pure epi-allo-pregnanolone.

The semicarbazone of epi-allo-pregnanolone can be crystallized from ethyl alcohol and has a melting point of 242° C., with decomposition. The semicarbazone is hydrolyzed by boiling it for 1½ hours with a mixture of 150 cc. of 95% alcohol, 15 cc. of concentrated sulfuric acid and 30 cc. of water. The resulting solution is poured into water and extracted with ether. The ether solution is washed with water and evaporated to dryness. The residue is then sublimed in a high vacuum at 130° C. and the sublimate crystallized several times from 70% acetone. The final product melts at 170° C. and gives no depression of melting point with epi-allo-pregnanolone isolated from human pregnancy urine.

Anal. Calcd. for $C_{21}H_{34}O_2$: C, 79.2; H, 10.7. Found: C, 78.9; H, 10.9.

The above examples are merely illustrations of the general method of the invention and are not intended to limit it to the specific substances and conditions described. For example other halogen derivatives than the chloro compounds may be carried through the oxidation steps to convert the hydrocarbon side-chain of the sterol halide into an acetyl group. Furthermore, it is not necessary that the halogen be attached at the 3-position of the sterol skeleton. For example, it may be present in the 2, 4, 6 or 7 positions with comparable results. Instead of chromic oxide, other equivalent oxidizing agents may be used for degrading the side-chain of the ring-saturated sterol halide.

What I claim as my invention is:

1. The method of preparing a hydroxy derivative of pregnanone-20 which comprises the stepwise oxidation of the hydrocarbon side-chain of a ring-saturated sterol halide to convert said side-chain to an acetyl group with production of a halogen derivative or pregnanone-20 and hydrolyzing the latter compound to a pregnanolone.

2. The method of preparing a pregnanol-3-one-20 compound which comprises the stepwise oxidation of the hydrocarbon side-chain of a 3-halogeno ring-saturated sterol to convert said side-chain to an acetyl group with production of a 3-halogeno derivative of a pregnanone-20 compound, and hydrolyzing the latter to a pregnanol-3-one-20 compound.

3. Method for the preparation of epi-allo-pregnanol-3-one-20 which comprises the stepwise oxidation of the side-chain of alpha-cholestyl chloride to an acetyl radical with production of epi-3-chloro-pregnanone-20 and hydrolyzing the latter compound to obtain epi-allo-pregnanol-3-one-20.

4. Method for the preparation of epi-allo-pregnanol-3-one-20 which comprises oxidizing the hydrocarbon side-chain of alpha-cholestyl chloride to convert said side-chain to an acetyl group with production of epi-3-chloro-allo-pregnanone-20 and hydrolyzing the latter compound to obtain epi-allo-pregnanol-3-one-20.

RUSSELL EARL MARKER.